(12) United States Patent
Teshima et al.

(10) Patent No.: US 11,525,509 B2
(45) Date of Patent: Dec. 13, 2022

(54) RESIN MEMBER

(71) Applicant: NIPPON PILLAR PACKING CO., LTD., Osaka (JP)

(72) Inventors: Kazukiyo Teshima, Osaka (JP); Naoto Yamada, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 62 days.

(21) Appl. No.: 16/756,758

(22) PCT Filed: Aug. 1, 2018

(86) PCT No.: PCT/JP2018/028903
§ 371 (c)(1),
(2) Date: Apr. 16, 2020

(87) PCT Pub. No.: WO2019/077843
PCT Pub. Date: Apr. 25, 2019

(65) Prior Publication Data
US 2021/0190064 A1 Jun. 24, 2021

(30) Foreign Application Priority Data
Oct. 17, 2017 (JP) .............................. JP2017-201253

(51) Int. Cl.
*F16J 3/02* (2006.01)
(52) U.S. Cl.
CPC ...................................... *F16J 3/02* (2013.01)
(58) Field of Classification Search
CPC ............ F16J 3/02; F15B 15/10; F15B 15/106

USPC ............... 92/96, 98 D, 103 R, 104; 428/64.1
See application file for complete search history.

(56) References Cited

U.S. PATENT DOCUMENTS 4,270,441 A * 6/1981 Tuck, Jr. .................... F16J 3/02
92/102
4,749,342 A * 6/1988 Fritsch .................. F04B 43/067
417/388
6,015,610 A * 1/2000 Minor ...................... G02B 1/04
359/515

(Continued)

FOREIGN PATENT DOCUMENTS

JP S61-197779 A 9/1986
JP H03-142401 A 6/1991

(Continued)

OTHER PUBLICATIONS http://rmico.com/reflection-and-refraction-of-light-tutorial (Year: 2016).*

(Continued)

*Primary Examiner* — Devon C Kramer
*Assistant Examiner* — Joseph S. Herrmann
(74) *Attorney, Agent, or Firm* — Millen, White, Zelano & Branig; Ryan Pool

(57) ABSTRACT

A resin member capable of inhibiting generation of particles due to repeated bending thereof is provided. A rolling diaphragm 5 composed of a resin member has one surface formed as a liquid contact surface 37a, repeatedly bends when used, and has flexibility. A surface roughness of the liquid contact surface 37a at a portion 371 that bends is less than 0.40 µm as an arithmetic average roughness, and a total light reflectance of the liquid contact surface 37a at the portion 371 that bends is not less than 2.0%.

1 Claim, 11 Drawing Sheets

(56) References Cited

U.S. PATENT DOCUMENTS

| | | | | |
|---|---|---|---|---|
| 6,067,893 | A * | 5/2000 | Drahusz, Jr. | F16J 3/02 |
| | | | | 92/96 |
| 7,293,967 | B2 * | 11/2007 | Fukano | F04B 43/04 |
| | | | | 417/413.1 |
| 7,905,172 | B2 * | 3/2011 | Ohrle | F04B 43/0054 |
| | | | | 92/103 R |

FOREIGN PATENT DOCUMENTS

| | | | |
|---|---|---|---|
| JP | H06-318019 A | | 11/1994 |
| JP | 2002-13478 A | | 1/2002 |
| JP | 2011-117322 A | | 6/2011 |
| KR | 20090057928 A | * | 6/2009 |
| KR | 20090057928 A | | 6/2009 |

OTHER PUBLICATIONS

International Search Report for PCT/JP2018/028903 dated Oct. 30, 2018.
English Translation of JP-2002-013478, Publication Date: Jan. 18, 2020.
English Translation of JPH-06-318019, Publication Date: Nov. 15, 1994.
English Translation of JPH-03-142401, Publication Date: Jun. 18, 1991.
English Translation of JP2011-117322, Publication Date: Jun. 16, 2011.
Extended European search Report issued for the corresponding European Patent Application No. 18 867 981.5 dated May 31, 2021 (pp. 1-7).

* cited by examiner

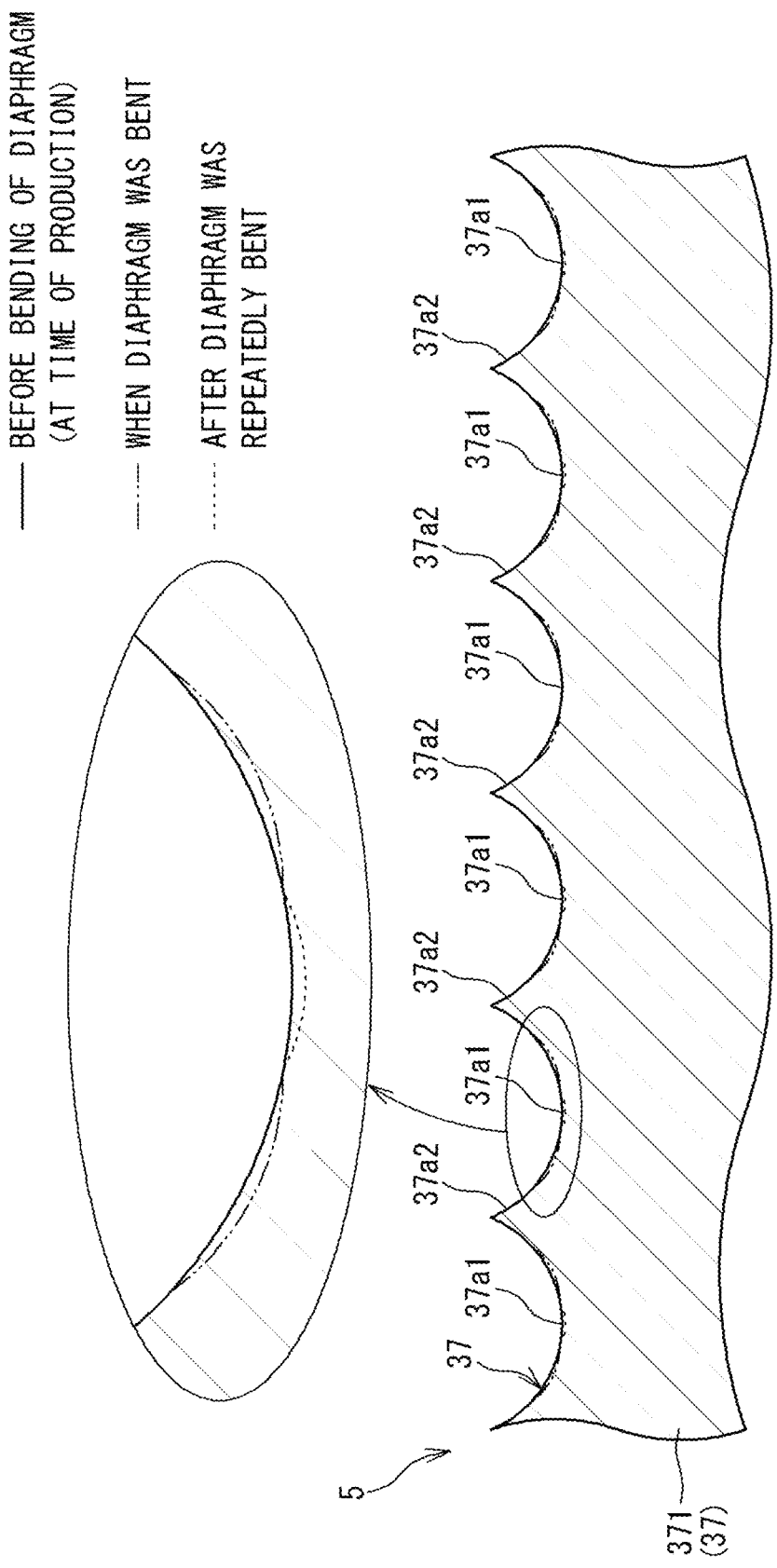

RESIN MEMBER

TECHNICAL FIELD

The present invention relates to a resin member.

BACKGROUND ART

For example, in a pump or a valve that is used when a chemical solution is applied or prepared in a production process for semiconductors, liquid crystal devices, organic EL devices, solar cells, etc., a diaphragm, a bellows, or the like that is composed of a flexible resin member is used as a component that repeatedly bends when the pump or the valve is driven (see, for example, PATENT LITERATURE 1 and FIG. 14 of PATENT LITERATURE 2).

CITATION LIST

Patent Literature

PATENT LITERATURE 1: Japanese Laid-Open Patent Publication No. S61-197779
PATENT LITERATURE 2: Japanese Laid-Open Patent Publication No. 2011-117322

SUMMARY OF INVENTION

Technical Problem

However, when the diaphragm or the like, which is composed of the resin member, is repeatedly bent, particles (fine dust) may be generated from a liquid contact surface of the diaphragm or the like due to deterioration of the diaphragm or the like over time. In this case, the particles transferred together with a chemical solution may be applied to a wafer or the like, thereby causing a problem such as a production defect.

The present invention has been made in view of such circumstances, and an object of the present invention is to provide a resin member capable of inhibiting generation of particles due to repeated bending thereof.

Solution to Problem (1) A resin member according to the present invention is a resin member having one surface formed as a liquid contact surface, the resin member repeatedly bending when used, the resin member having flexibility, wherein a surface roughness of the liquid contact surface at a portion that bends is less than 0.40 µm as an arithmetic average roughness, and a total light reflectance of the liquid contact surface at the portion that bends is not less than 2.0%.

The inventors of the present application have conducted thorough research. As a result, the inventors have found that generation of particles can be effectively inhibited by decreasing the surface roughness of the liquid contact surface at the portion of the resin member that bends and increasing the total light reflectance of the liquid contact surface at the portion that bends, and have completed the invention according to the above (1) on the basis of this finding. Accordingly, generation of particles due to repeated bending of the resin member can be inhibited.

(2) In the resin member, preferably, a cross-sectional shape of the liquid contact surface at the portion that bends is a shape in which recesses and projections are alternately continuous, and the recesses are formed by concave curved surfaces.

In this case, in the cross-sectional shape of the liquid contact surface at the portion that bends, no flat surfaces are formed at the recesses, and thus the number of the recesses is increased. As a result, the surface roughness of the liquid contact surface at the portion that bends can be effectively decreased, and the total light reflectance of the liquid contact surface at the portion that bends can be effectively increased. Thus, occurrence of particles due to repeated bending of the resin member can be further effectively inhibited.

Moreover, since the recesses are formed by concave curved surfaces, stress due to the repeated bending is less likely to be generated than in the conventional art. Accordingly, parts of the liquid contact surface are less likely to rub against each other at the recesses, and thus generation of particles from the liquid contact surface at the recesses can be inhibited.

(3) In the resin member, preferably, the cross-sectional shape of the liquid contact surface at the portion that bends is a shape in which recesses and projections are alternately continuous, and ends of the projections are formed as sharp ends.

In this case, in the cross-sectional shape of the liquid contact surface at the portion that bends, no flat surfaces are formed at the projections, and thus the number of the projections is increased. As a result, the surface roughness of the liquid contact surface at the portion that bends can be effectively decreased, and the total light reflectance of the liquid contact surface at the portion that bends can be effectively increased. Thus, occurrence of particles due to repeated bending of the resin member can be further effectively inhibited.

Moreover, since the ends of the projections are formed as sharp ends, stress due to the repeated bending is less likely to be generated. Accordingly, parts of the liquid contact surface are less likely to rub against each other at the projections, and thus generation of particles from the liquid contact surface at the projections can be inhibited.

Advantageous Effects of Invention

The resin member according to the present invention can inhibit generation of particles due to repeated bending.

BRIEF DESCRIPTION OF DRAWINGS

FIG. 5 is an enlarged cross-sectional view showing change in an uneven shape of a liquid contact surface at a bending portion of the rolling diaphragm of the embodiment.

DESCRIPTION OF EMBODIMENTS

Next, preferred embodiments of the present invention will be described with reference to the accompanying drawings.

First Embodiment

Figure 1:
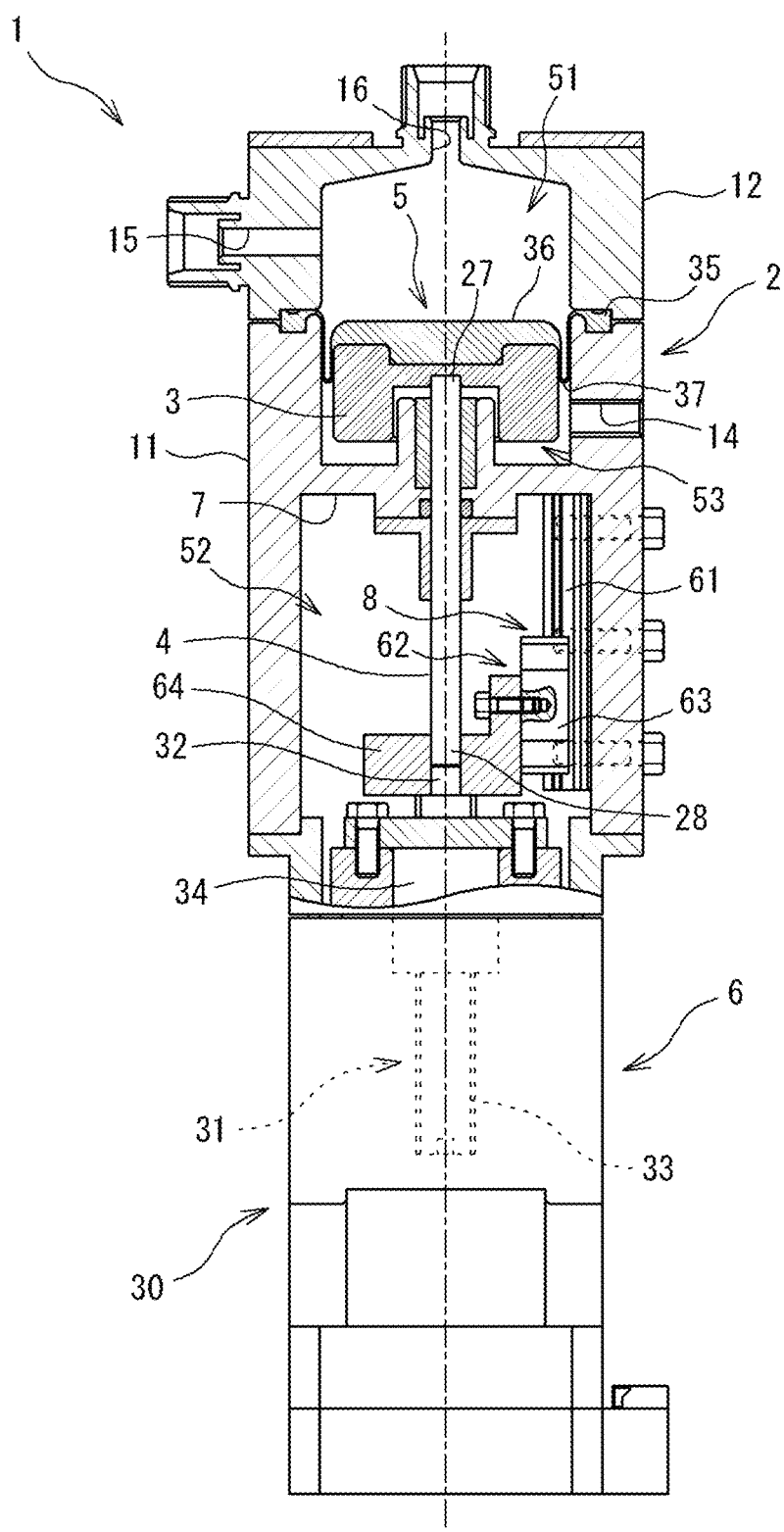
FIG. 1 is a cross-sectional view of a diaphragm pump including a rolling diaphragm composed of a resin member according to a first embodiment of the present invention.

FIG. 1 is a cross-sectional view of a diaphragm pump including a rolling diaphragm composed of a resin member according to a first embodiment of the present invention. The diaphragm pump 1 in FIG. 1 is a pump that is used, for example, in a semiconductor production apparatus when a chemical solution or the like is applied, and includes a housing 2, a piston 3, a shaft 4, a rolling diaphragm 5, a driving device 6, a guide member 7, and a restriction mechanism 8. The diaphragm pump 1 in the present embodiment is disposed such that the longitudinal direction (axial direction) thereof corresponds to an up-down direction, but may be disposed such that the longitudinal direction thereof corresponds to a horizontal direction.

In the present embodiment, the housing 2 has a cylinder 11 and a pump head 12. The cylinder 11 is formed in a cylindrical shape, and is disposed such that the axial direction thereof corresponds to the up-down direction. The cylinder 11 is formed from, for example, stainless steel such as SUS304. The cylinder 11 has a vent port 14 formed so as to penetrate the cylinder 11 in a direction crossing the axial direction. The vent port 14 is connected to a pressure-reducing device (not shown) such as a vacuum pump or an aspirator.

The pump head 12 is formed in a bottomed cylindrical shape, and is mounted at one end side in the axial direction (the upper end side) of the cylinder 11 such that the opening of the cylinder 11 is closed. The pump head 12 has an inner diameter substantially equal to that of the cylinder 11, and, together with the cylinder 11, forms a housing space in which the piston 3 can be housed. The pump head 12 is formed from a fluorine resin such as polytetrafluoroethylene (PTFE) or a tetrafluoroethylene-perfluoro alkyl vinyl ether copolymer (PFA).

A peripheral wall portion of the pump head 12 has a suction port 15 formed so as to penetrate the peripheral wall portion in a direction orthogonal to or crossing the axial direction. The suction port 15 is connected to a liquid tank (not shown) for storing a liquid (transport fluid) such as a chemical solution.

A lid portion of the pump head 12 has a discharge port 16 formed so as to penetrate the lid portion in the axial direction and be located at a center portion (axial portion) of the lid portion. The discharge port 16 is connected to, for example, a liquid supply portion (not shown) such as a spray nozzle for applying a liquid.

The piston 3 is disposed within the housing 2 coaxially with the housing 2, and is disposed so as to be movable in a reciprocating manner in the axial direction of the housing 2 (the up-down direction). In the present embodiment, the piston 3 is formed in a columnar shape having a diameter smaller than the inner diameter of the housing 2 (the cylinder 11 and the pump head 12). The outer peripheral surface of the piston 3 is located at a predetermined interval with respect to the inner peripheral surface of the cylinder 11 or the pump head 12 that opposes the outer peripheral surface. The piston 3 is formed from, for example, an aluminum alloy.

Figure 2:
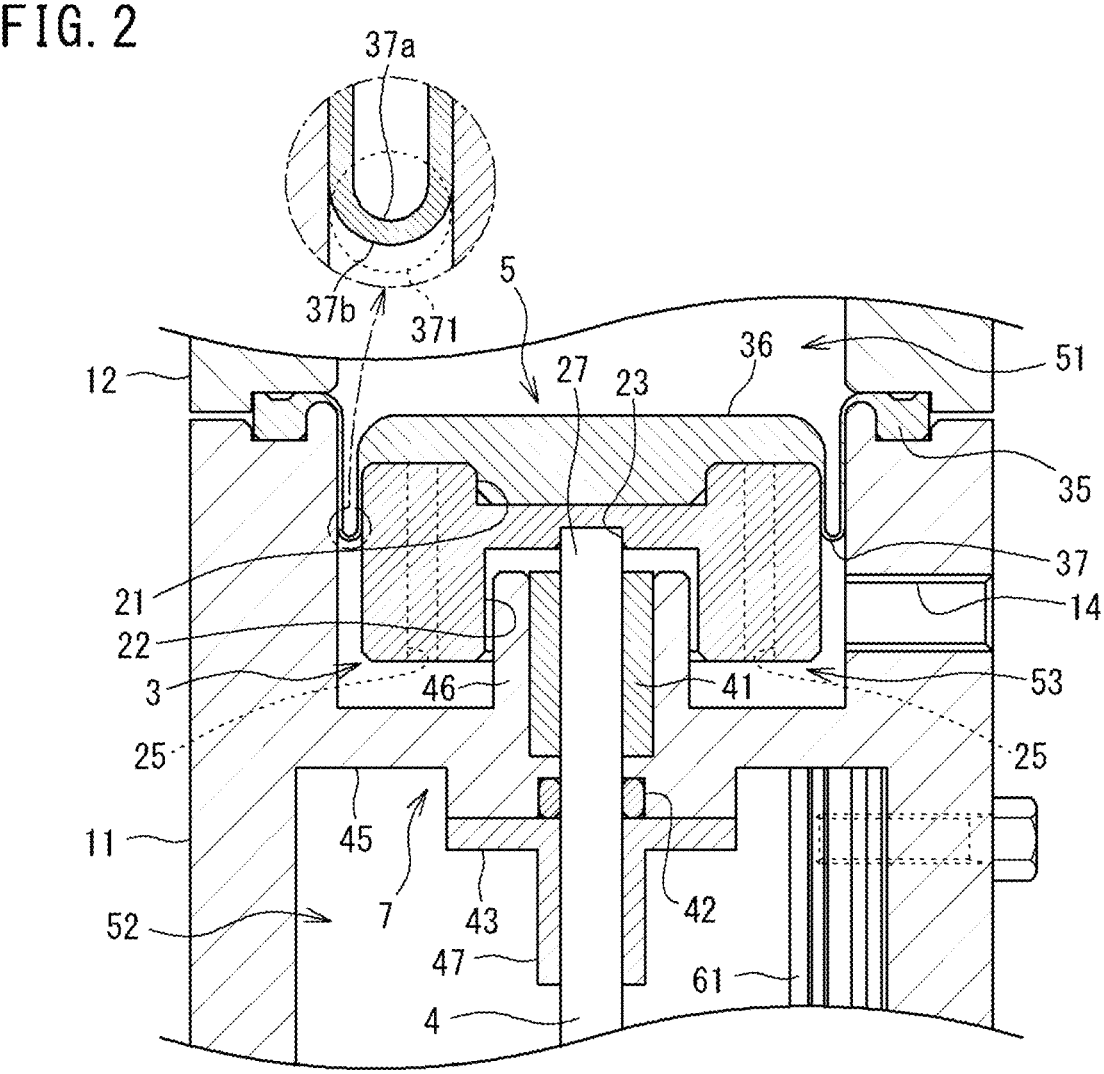
FIG. 2 is a partially enlarged cross-sectional view of the diaphragm pump in FIG. 1.

FIG. 2 is a partially enlarged cross-sectional view of the diaphragm pump 1 in FIG. 1. As shown in FIG. 2, the piston 3 has a first recess 21 that is open at the one end side in the axial direction (the upper end side), and also has a second recess 22 that is open at the other end side in the axial direction (the lower end side). The first recess 21 and the second recess 22 are each formed on an axial portion of the piston 3, and are located coaxially with each other. The first recess 21 and the second recess 22 do not communicate with each other.

The piston 3 has a fitting recess 23 that allows one axial end portion of the shaft 4 to be fitted therein. The fitting recess 23 is formed on the axial portion of the piston 3 between the first recess 21 and the second recess 22, and is located coaxially with the second recess 22. The fitting recess 23 has a smaller diameter than the second recess 22, and is open at the other end side in the axial direction (the lower end side) of the piston 3 so as to face the interior of the second recess 22.

The piston 3 has an air passage 25 formed as a linear through hole that penetrates the piston 3 in the axial direction. A plurality of air passages 25 are formed at the outer side with respect to the first recess 21 and the second recess 22 in the radial direction (direction orthogonal to the axial direction) so as to be arranged at predetermined intervals in the circumferential direction.

The shaft 4 is configured to move together with the piston 3, when an axial end portion (upper end portion) 27 of the shaft 4 is fitted into the fitting recess 23 of the piston 3. The shaft 4 is provided along the axial direction and disposed coaxially with the housing 2 and the piston 3. The shaft 4 is formed from, for example, hardened steel such as high carbon chromium bearing steel, or stainless steel such as martensitic stainless steel.

In FIG. 1, the driving device 6 has a stepping motor 30, and an output shaft 31 that is disposed coaxially with the shaft 4 and that is connected to the other end side in the axial direction of the shaft 4. The driving device 6 is mounted at the other side in the axial direction (the lower side) of the housing 2, and is configured to be able to convert rotational motion of the stepping motor 30 into linear motion and output the linear motion from the output shaft 31 to the shaft 4 in order to cause the piston 3 to move in a reciprocating manner in the axial direction via the shaft 4.

Figure 3:
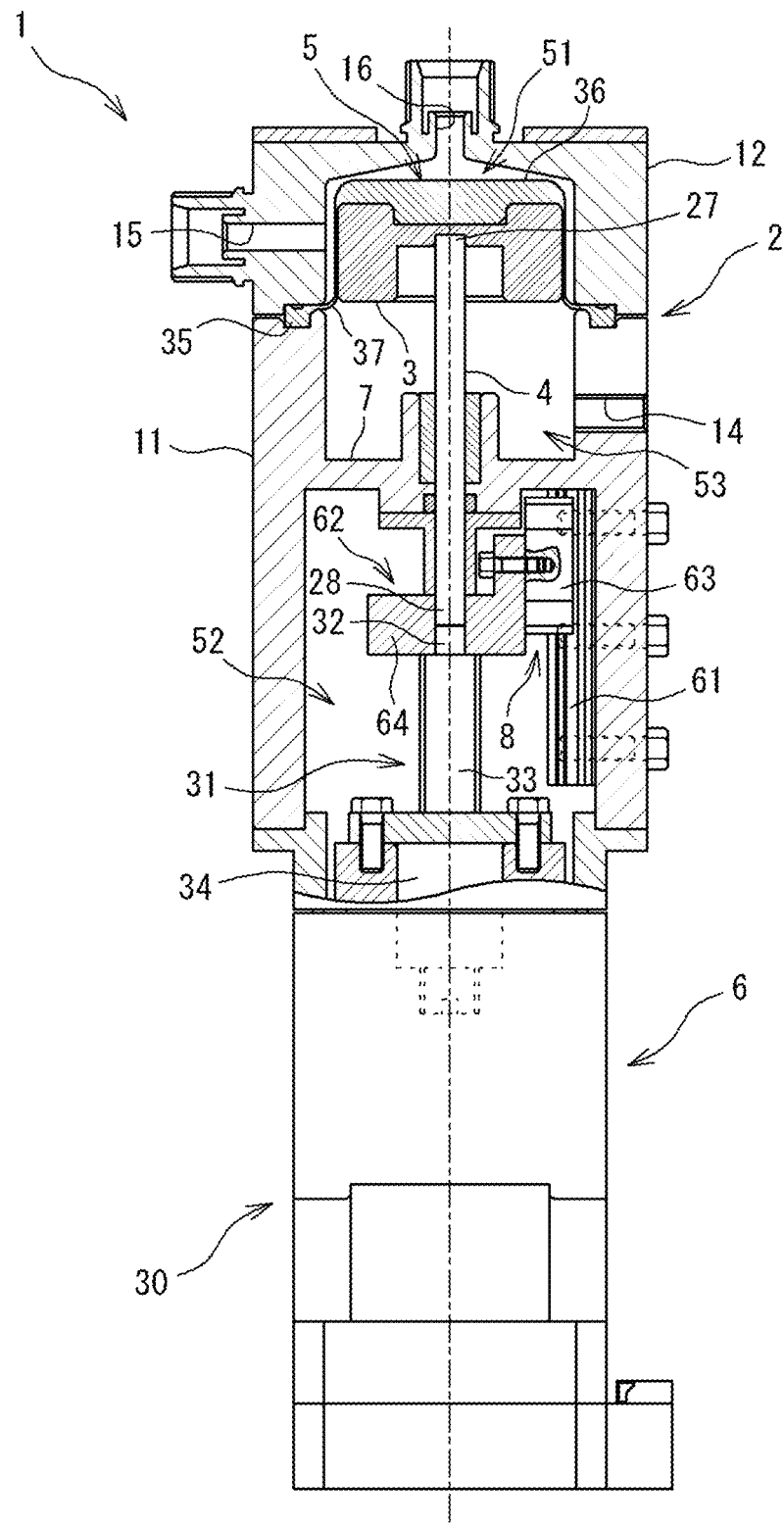
FIG. 3 is a cross-sectional view showing a state where a piston of the diaphragm pump is at a most advanced position.

In the present embodiment, the driving device 6 is composed of a linear actuator, and is configured to be able to cause the piston 3 to move in a reciprocating manner within the housing 2 in the axial direction between a most retracted position (see FIG. 1) and a most advanced position (see FIG. 3). The driving device 6 has a linear motion mechanism portion that is able to convert rotational motion of the stepping motor 30 into linear motion and output the linear motion.

The output shaft 31 of the driving device 6 has a round bar portion 32 and a screw shaft portion 33 that is integrally connected to the round bar portion 32. The output shaft 31 is included in the linear motion mechanism portion together with a screw nut 34 that is screwed with the screw shaft portion 33. The output shaft 31 is provided so as to project upward from an opposing surface, of a main body of the driving device 6, facing the interior of the cylinder 11, toward the interior of the cylinder 11. The output shaft 31 is disposed coaxially with the shaft 4, and is connected at the projecting end portion (upper end portion) side, that is, at the round bar portion 32 thereof to another axial end portion (lower end portion) 28 of the shaft 4.

The linear actuator as the driving device 6 has substantially the same configuration as a general linear actuator, and thus the detailed description of the other configuration of the linear actuator is omitted.

In FIG. 2, the rolling diaphragm 5 is composed of a fluorine resin member of polytetrafluoroethylene (PTFE), a tetrafluoroethylene-perfluoro alkyl vinyl ether copolymer (PFA), or the like, and is housed within the housing 2. The rolling diaphragm 5 has an annular fixed portion 35 that is mounted on the housing 2, a disc-shaped movable portion 36 that is disposed at the one side in the axial direction of the piston 3, and a cylindrical connection portion 37 that connects the fixed portion 35 to the movable portion 36. The rolling diaphragm 5 is configured such that the movable portion 36 moves, relative to the fixed portion 35 fixed in position by the housing 2, in a reciprocating manner in the axial direction integrally with the piston 3.

The fixed portion 35 is located between the cylinder 11 and the pump head 12 and fixed to the housing 2 side by being strongly held between joined surfaces of the cylinder 11 and the pump head 12.

The movable portion 36 has a diameter substantially equal to that of the piston 3, and is disposed radially inward of the fixed portion 35. The movable portion 36 is fitted and fixed in the first recess 21 of the piston 3.

The connection portion 37 connects the radially inner end of the fixed portion 35 to the radially outer end of the movable portion 36. The connection portion 37 of the present embodiment is formed to be thin (in a thin film shape), for example, such that the thickness thereof is not greater than 1 mm and not less than 0.1 mm, so as to have flexibility. Meanwhile, the fixed portion 35 and the movable portion 36 are each formed to be sufficiently thicker than the connection portion 37 so as to have rigidity. The connection portion 37 only has to have predetermined flexibility, and the thickness thereof is not limited to a thickness not greater than 1 mm and not less than 0.1 mm.

The connection portion 37 is bent in a U cross-sectional shape between the inner peripheral surface of the housing 2 and the outer peripheral surface of the piston 3 in a state shown in FIG. 2 (FIG. 1). Specifically, the connection portion 37 extends from the radially inner end of the fixed portion 35 along the inner peripheral surface of the cylinder 11 to the other side in the axial direction (the lower side), then is folded back to the radially inner side, and extends along the outer peripheral surface of the piston 3 toward the one side in the axial direction (the upper side) to the movable portion 36. In addition, in a state shown in FIG. 3, the connection portion 37 becomes deformed so as to extend between the inner peripheral surface of the housing 2 and the outer peripheral surface of the piston 3 toward the one side in the axial direction (the upper side).

As shown in FIG. 2, the outer peripheral surface (one surface) of the connection portion 37 faces a pump chamber 51 (described later), and is formed as a liquid contact surface 37a with which a liquid filling the pump chamber 51 is in contact. In addition, the inner peripheral surface (another surface) of the connection portion 37 faces a pressure reduction chamber 53 (described later) formed so as to be separated from the pump chamber 51, and is formed as a non-liquid contact surface 37b with which the liquid within the pump chamber 51 is not in contact.

The guide member 7 is disposed within the housing 2 at the other side in the axial direction (the lower side) with respect to the piston 3 and mounted on the housing 2, and is configured to be able to guide the shaft 4 such that the shaft 4 is movable in the axial direction. In the present embodiment, the guide member 7 functions as a partition that partitions the interior of the housing 2. The guide member 7 is formed in a plate shape such that the outer peripheral surface thereof extends along the inner peripheral surface of the housing 2, and is connected at the outer peripheral surface to the inner peripheral surface of the cylinder 11 without any gap. The guide member 7 is configured to guide the shaft 4 penetrating an axial portion of the guide member 7, and is formed so as to be integrated with the cylinder 11.

The guide member 7 is configured to allow the shaft 4 to penetrate the axial portion thereof in the axial direction and directly guide the shaft 4 at the other side in the axial direction (the lower side). In addition, the guide member 7 is configured to support the shaft 4 at the one side in the axial direction (the upper side) of the guide member 7 via a bushing 41 provided at the axial portion of the guide member 7. The bushing 41 is formed from, for example, a metal or a resin such as carbon steel, stainless steel, brass, a fluorine resin, or nylon. In addition, a packing 42 such as an O-ring is provided between the guide member 7 and the shaft 4. The packing 42 is formed from, for example, a rubber material such as a fluorine rubber. A packing holding member 43 is provided so as to oppose the packing 42 and is formed from, for example, stainless steel such as SUS304.

The guide member 7 is disposed close to the piston 3 within the housing 2, and has a guide member body 45 and a boss portion 46 that projects from an axial portion of the guide member body 45 toward the upper side. The boss portion 46 is formed such that the boss portion 46 is able to be fitted into the second recess 22 and movably guide the piston 3 when the piston 3 moves to the most retracted position or a position near the most retracted position. In the present embodiment, the bushing 41 is provided so as to extend over the guide member body 45 and the boss portion 46.

In the present embodiment, a tubular restriction member 47 is further provided at a side opposite to the boss portion 46 across the guide member body 45 (at the lower side of the guide member 7). The restriction member 47 serves to restrict upward sliding movement of a later-described slide member 62. The restriction member 47 is disposed coaxially with the bushing 41 so as to be able to support the shaft 4. The restriction member 47 of the present embodiment is formed so as to be integrated with the packing holding member 43 which holds the packing 42 from below.

In FIG. 1, the interior of the housing 2 of the diaphragm pump 1 is partitioned by the rolling diaphragm 5, the guide member 7, etc., such that the pump chamber 51 for filling with a liquid, a driving chamber 52, and the pressure reduction chamber 53 are formed.

Specifically, the pump chamber 51 is defined by the rolling diaphragm 5 within the housing 2 at the one side in the axial direction (the upper side) with respect to the rolling diaphragm 5, and is configured such that the volume of the interior of the pump chamber 51 is variable. In the present embodiment, the pump chamber 51 is formed so as to be surrounded by the rolling diaphragm 5 and the pump head 12 of the housing 2, and communicates with each of the suction port 15 and the discharge port 16. The pump chamber 51 is configured such that the volume of the interior thereof varies due to motion (deformation) of the rolling diaphragm 5 caused when the piston 3 moves in a reciprocating manner.

The driving chamber 52 is defined by the guide member 7 within the housing 2 at the other side in the axial direction (the lower side) with respect to the guide member 7. In the present embodiment, the driving chamber 52 is formed so as to be surrounded by the guide member 7, the cylinder 11 of the housing 2, and the driving device 6. In the driving chamber 52, a part of the output shaft 31 of the driving device 6 and a part of the shaft 4 are housed.

The pressure reduction chamber 53 is defined by the piston 3, the rolling diaphragm 5, and the guide member 7 within the housing 2 between the pump chamber 51 and the driving chamber 52. In the present embodiment, the pressure reduction chamber 53 is formed so as to be surrounded by the piston 3, the rolling diaphragm 5, the guide member 7, and the cylinder 11 of the housing 2, and communicates with the vent port 14.

The pressure reduction chamber 53 is configured such that the pressure in the pressure reduction chamber 53 is reduced to a predetermined pressure (negative pressure) by the pressure-reducing device, which is connected thereto via the vent port 14, when the diaphragm pump 1 is driven. The pressure reduction chamber 53 provides communication between the upper surface of the piston 3 and the lower surface of the movable portion 36 of the rolling diaphragm 5, which are in butt-contact with each other, via the plurality of air passages 25 of the piston 3.

The restriction mechanism 8 is provided within the housing 2 between the housing 2 and the shaft 4 at the other side in the axial direction with respect to the guide member 7, and is configured to be able to restrict rotation of the shaft 4 about the axis of the shaft 4 while permitting the shaft 4 to move in a reciprocating manner in the axial direction. In the present embodiment, the restriction mechanism 8 is provided within the driving chamber 52, and is composed of a linear motion guide that is able to relatively move the slide member 62 along a guide member 61.

Specifically, the restriction mechanism 8 has the rail-like guide member 61 that is provided on the housing 2 so as to face the interior of the driving chamber 52 and extend along the axial direction of the housing 2, and the slide member 62 that is fixed to the shaft 4 and mounted on the guide member 61 and that is movable relative to the guide member 61. The slide member 62 is fitted to the guide member 61 via balls (not shown), which are a plurality of rolling elements disposed within the slide member 62, so as to be movable relative to the guide member 61. In this manner, the slide member 62 is configured to slide in the axial direction relative to the guide member 61 without rattling.

The slide member 62 has a slide portion 63 and a connection portion 64 that is fixed to the slide portion 63. The slide portion 63 is mounted onto the guide member 61 so as to be disposed astride the guide member 61 from the axial side of the housing 2, and is configured to be movable in a sliding manner in the axial direction while being guided by the guide member 61. The connection portion 64 is fitted on the shaft 4, and is fixed such that the connection portion 64 moves together with the shaft 4 with reciprocating movement of the shaft 4. When the connection portion 64 moves upward, upward movement of the entire slide member 62 is restricted by the connection portion 64 abutting against the restriction member 47 (see FIG. 3).

In the configuration described above, when the driving device 6 is operated for driving the diaphragm pump 1, the output shaft 31 makes a linear motion in the axial direction with rotation of the screw nut 34, whereby the shaft 4 moves in a reciprocating manner in the axial direction to repeatedly perform a suction process in which the shaft 4 moves forward in the downward direction and a discharge process in which the shaft 4 moves backward in the upward direction. Accordingly, a liquid stored in the liquid tank can be supplied to the liquid supply portion in a constant amount at a constant flow rate.

That is, in the suction process, the piston 3 and the movable portion 36 of the rolling diaphragm 5 move forward in the downward direction so as to follow forward movement of the shaft 4 (the state is changed from the state shown in FIG. 3 to the state shown in FIG. 1). In this process, the rolling diaphragm 5 rolls so as to be displaced in the downward direction, while the connection portion 37 is bending, from a state where the connection portion 37 extends in the axial direction in the gap between the inner peripheral surface of the housing 2 and the outer peripheral surface of the piston 3. Accordingly, the volume of the pump chamber 51 is increased, and thus the liquid within the liquid tank is sucked through the suction port 15 into the pump chamber 51.

In addition, in the discharge process, the piston 3 and the movable portion 36 of the rolling diaphragm 5 move backward in the upward direction so as to follow backward movement of the shaft 4 (the state is changed from the state shown in FIG. 1 to the state shown in FIG. 3). In this process, the rolling diaphragm 5 rolls so as to be displaced in the upward direction while the connection portion 37 is bending in the gap between the inner peripheral surface of the housing 2 and the outer peripheral surface of the piston 3. Accordingly, the volume of the pump chamber 51 is decreased, and thus the liquid within the pump chamber 51 is discharged through the discharge port 16.

In the suction process and the discharge process, the pressure in the pressure reduction chamber 53 is reduced to a predetermined pressure (negative pressure) by the pressure-reducing device connected thereto via the vent port 14. Accordingly, the lower surface of the movable portion 36 of the rolling diaphragm 5 can be assuredly brought into close contact with the upper surface of the piston 3. In addition, the inner peripheral surface of the connection portion 37 and the outer peripheral surface of the connection portion 37 can be assuredly brought into close contact with the outer peripheral surface of the piston 3 and the inner peripheral surface of the housing 2, respectively.

When the suction process and the discharge process are alternately and repeatedly performed as described above, a bending motion from the state before bending shown in FIG. 3 to a state during bending in which a portion 371 that bends into a U cross-sectional shape (hereinafter, also referred to as a bending portion 371) is formed as shown in FIG. 1 is repeatedly performed in the connection portion 37 of the rolling diaphragm 5. Thus, on the liquid contact surface 37a at the pump chamber 51 side at the bending portion 371, particles (fine dust) may be generated due to deterioration over time caused by the bending motion.

Figure 4:
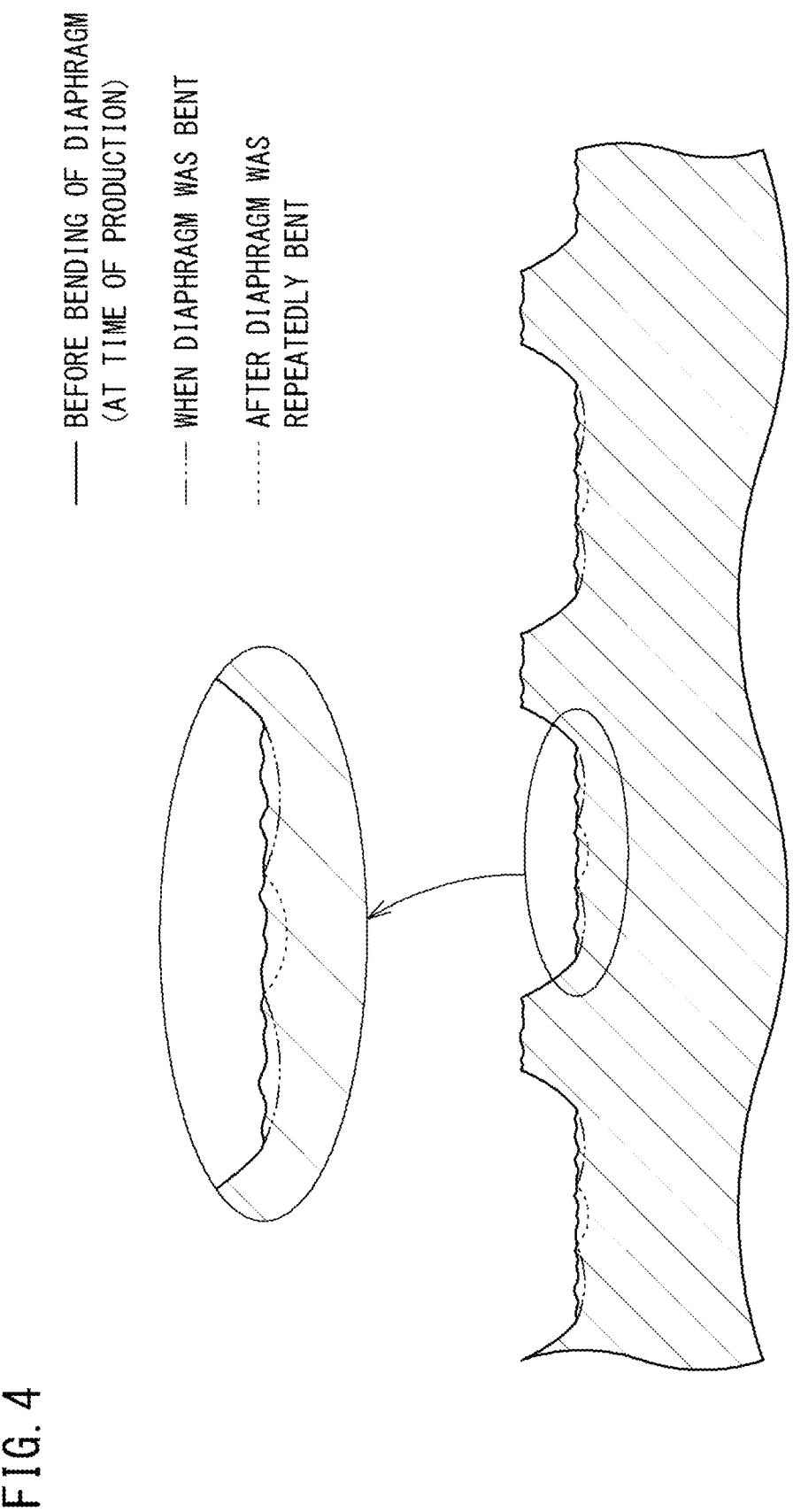
FIG. 4 is an enlarged cross-sectional view showing change in an uneven shape of a liquid contact surface at a bending portion of a conventional rolling diaphragm.

Here, the mechanism of generation of particles at the rolling diaphragm will be described. FIG. 4 is an enlarged cross-sectional view showing change in an uneven shape (referred to as "surface roughness" in the present specification) of a liquid contact surface at a bending portion of a conventional rolling diaphragm. FIG. 4 is a schematic diagram when the cross-sectional shape of the liquid contact surface at the bending portion was observed at a magnification of about 1000 times with a microscope (the same applies to FIG. 5, FIG. 10, and FIG. 11 described later).

As shown in FIG. 4, the uneven shape (cross-sectional shape) of the liquid contact surface at the bending portion of the conventional rolling diaphragm is a shape in which recesses and projections are alternately continuous, and a rough flat surface having minute bumps and depressions is formed at each of the bottoms of the recesses and the ends of the projections. In such a conventional rolling diaphragm, regarding the uneven shape of the liquid contact surface at the bending portion, a shape before bending (shape at the time of production) shown by a solid line in FIG. 4 and a shape during bending shown by alternate long and two short dashes lines in FIG. 4 are alternately repeated over a long period of time, whereby the recesses of the liquid contact surface at the bending portion become deformed (deteriorate over time) such that the depths thereof are larger as shown by broken lines in FIG. 4, resulting in an increase in the surface roughness of the liquid contact surface.

By further repeating the above bending motion in a state where the surface roughness of the liquid contact surface at the bending portion is increased due to repetition of the bending motion as described above, parts, of the liquid contact surface, opposing each other at the bending portion easily rub against each other. Then, when these parts of the liquid contact surface rub against each other, fine abrasion powder of a fluorine resin member forming the bending portion accumulates at the recesses and the projections of the liquid contact surface, and the accumulating abrasion powder is washed away by a liquid that is a transport fluid. The washed-away abrasion powder becomes particles generated from the liquid contact surface at the bending portion.

Therefore, in the present invention, in order to inhibit generation of the particles, at the time of production of the rolling diaphragm 5 (before use), the surface roughness of the liquid contact surface 37a at the bending portion 371 is set to be less than 0.40 μm as an arithmetic average roughness (Ra). In addition, in the present invention, in order to inhibit generation of the particles, at the time of production of the rolling diaphragm 5 (before use), the total light reflectance of the liquid contact surface 37a at the bending portion 371 in the wavelength range of 300 nm to 800 nm is set to be not less than 2.0% and not greater than 3.0%. In particular, in the present embodiment, the surface roughness of the liquid contact surface 37a at the bending portion 371 is set to 0.10 μm as an arithmetic average roughness, and the total light reflectance of the liquid contact surface 37a in the wavelength range of 300 nm to 800 nm is set to be not less than 2.0% and not greater than 3.0% (the average of the total light reflectance in the wavelength range of 300 nm to 800 nm is set to 2.2%).

Here, the arithmetic average roughness (Ra) is measured on the basis of the method described in JIS B 0601. In addition, the total light reflectance is measured on the basis of the method described in JIS Z 8741. The total light reflectance measurement is performed in the wavelength range of 200 nm to 2700 nm, but the wavelength range of 300 nm to 800 nm that is a range close to visible light in the wavelength range of 200 nm to 2700 nm is targeted.

FIG. 5 is an enlarged cross-sectional view showing change in an uneven shape (surface roughness) of the liquid contact surface 37a at the bending portion 371 of the rolling diaphragm 5 of the present embodiment. As shown in FIG. 5, the uneven shape (cross-sectional shape) of the liquid contact surface 37a at the bending portion 371 of the rolling diaphragm 5 of the present embodiment is a shape in which recesses 37a1 and projections 37a2 are alternately continuous, the recesses 37a1 are formed by smooth concave arc surfaces (concave curved surfaces), and the ends of the projections 37a2 are formed as sharp ends (the angle at each end is less than 90°). Thus, unlike the conventional uneven shape (see FIG. 4), no flat surfaces are formed at the recesses 37a1 and the projections 37a2 of the present embodiment. The recesses 37a1 may be concave curved surfaces other than concave arc surfaces.

In the rolling diaphragm 5 of the present embodiment as well, regarding the uneven shape of the liquid contact surface 37a at the bending portion 371, a shape before bending (shape at the time of production) shown by a solid line in FIG. 5 and a shape during bending shown by alternate long and two short dashes lines in FIG. 5 are alternately repeated over a long period of time, whereby the recesses of the liquid contact surface 37a at the bending portion 371 become deformed such that the depths thereof are larger as shown by broken lines in FIG. 5.

However, when the deformation of the recesses of the liquid contact surface 37a at the bending portion 371 shown by the broken lines in FIG. 5 is compared to the deformation of the recesses of the liquid contact surface at the conventional bending portion shown by the broken lines in FIG. 4, it is found that the amount of the deformation is small, so that an increase in the surface roughness due to repetition of the bending motion can be inhibited. Therefore, parts, of the liquid contact surface 37a at the bending portion 371, opposing each other can be inhibited from rubbing against each other as described above, and thus abrasion powder of the fluorine resin member forming the bending portion 371 can be effectively inhibited from being generated as particles from the liquid contact surface 37a.

As described above, in the rolling diaphragm 5 composed of the resin member of the present embodiment, since the surface roughness of the liquid contact surface 37a at the bending portion 371 is set to be less than 0.40 μm as an arithmetic average roughness, particles can be inhibited from being generated even when the bending portion 371 is repeatedly bent. As a result, occurrence of a production defect or the like due to application of particles transferred together with a liquid, to a wafer or the like, can be effectively inhibited.

Moreover, since the surface roughness of the liquid contact surface 37a at the bending portion 371 is set to 0.10 μm as an arithmetic average roughness, and the total light reflectance of the liquid contact surface 37a in the wavelength range of 300 nm to 800 nm is set to be not less than 2.0% and not greater than 3.0% (the average of the total light reflectance in the wavelength range of 300 nm to 800 nm is set to 2.2%), generation of particles due to repeated bending of the bending portion 371 can be further effectively inhibited.

Furthermore, when observed at a magnification of 1000 times, the cross-sectional shape of the liquid contact surface 37a at the bending portion 371 is a shape in which the recesses 37a1 and the projections 37a2 are alternately continuous, the recesses 37a1 are formed by concave arc surfaces, and the ends of the projections 37a2 are formed as sharp ends. Accordingly, no flat surfaces are formed at the bottoms of the recesses 37a1 and the ends of the projections 37a2 in the cross-sectional shape of the liquid contact surface 37a at the bending portion 371, and thus the number of the recesses 37a1 and the projections 37a2 is increased. As a result, the surface roughness of the liquid contact surface 37a at the bending portion 371 can be effectively decreased, and the total light reflectance of the liquid contact surface 37a at the bending portion 371 can be effectively increased. Thus, occurrence of particles due to repeated bending of the bending portion 371 can be further effectively inhibited.

Moreover, since the recesses 37a1 are formed by smooth concave arc surfaces, stress due to the repeated bending is less likely to be generated than in the conventional art. Accordingly, parts of the liquid contact surface 37a are less likely to rub against each other at the recesses 37a1, and thus occurrence of particles from the liquid contact surface 37a at the recesses 37a1 can be inhibited.

Moreover, since the ends of the projections 37a2 are formed as sharp ends, stress due to the repeated bending is less likely to be generated. Accordingly, parts of the liquid contact surface 37a are less likely to rub against each other at the projections 37a2, and thus occurrence of particles from the liquid contact surface 37a at the projections 37a2 can be inhibited.

Next, a verification test conducted by the present inventors in order to verify the effects obtained by the rolling diaphragm 5 of the present embodiment will be described. In the verification test, the conventional rolling diaphragm and the rolling diaphragm 5 of the present embodiment were each repeatedly bent 5 million times from the time of production, then the surface roughness of the liquid contact surface at the bending portion of each diaphragm was measured, and comparative verification was performed. In the conventional rolling diaphragm, the surface roughness of the liquid contact surface at the bending portion at the time of production was set to 0.41 µm as an arithmetic average roughness, and the average of the total light reflectance of the liquid contact surface in the wavelength range of 300 nm to 800 nm was set to 1.6%.

Figure 6A:
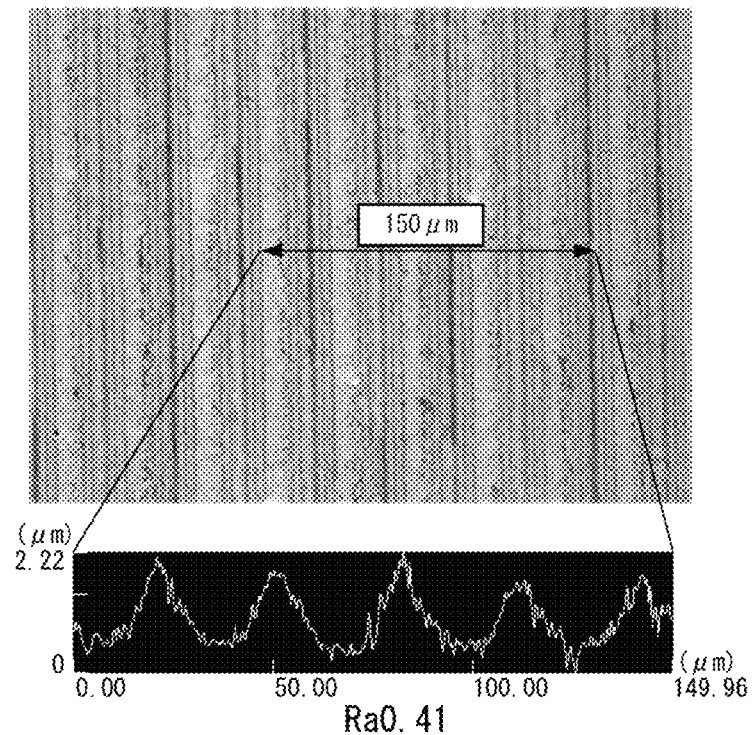
FIG. 6A is a drawing-substituting photograph showing a micrograph obtained by photographing the liquid contact surface at the bending portion from the front at the time of production of the conventional rolling diaphragm.
Figure 6B:
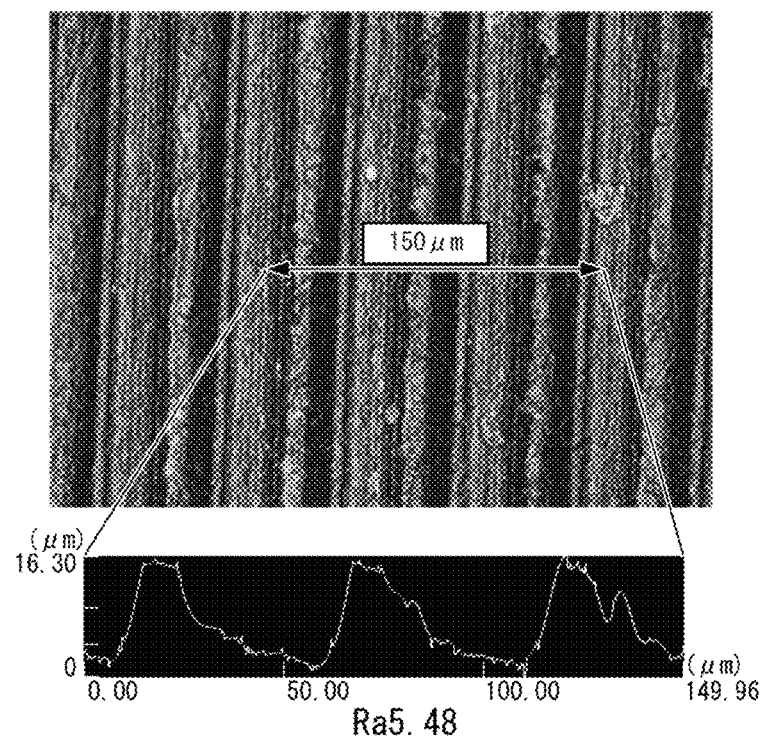
FIG. 6B is a drawing-substituting photograph showing a micrograph obtained by photographing the liquid contact surface at the bending portion from the front after the conventional rolling diaphragm was repeatedly bent.

FIG. 6A is a drawing-substituting photograph showing a micrograph obtained by photographing the liquid contact surface at the bending portion from the front at the time of production of the conventional rolling diaphragm (before use) in the verification test. FIG. 6B is a drawing-substituting photograph showing a micrograph obtained by photographing the liquid contact surface at the bending portion from the front after the conventional rolling diaphragm was repeatedly bent 5 million times in the verification test. At the lower side of each of FIG. 6A and FIG. 6B, an enlarged cross-sectional view taken for a predetermined length (about 150 µm) at an arbitrary location on the liquid contact surface is also shown.

As shown in FIG. 6A and FIG. 6B, when the conventional rolling diaphragm was repeatedly bent 5 million times from the time of production, it is found that, in the uneven shape of the liquid contact surface at the bending portion, the number of projections decreased, and the top of each projection became deformed into a flat shape. The surface roughness of the liquid contact surface after the repeated bending of 5 million times was 5.48 µm as an arithmetic average roughness and was significantly increased as compared to the surface roughness (0.41 µm as an arithmetic average roughness) at the time of production. Meanwhile, the average of the total light reflectance of the liquid contact surface in the wavelength range of 300 nm to 800 nm after the repeated bending of 5 million times was 1.6% and unchanged from the average of the total light reflectance in the wavelength range of 300 nm to 800 nm at the time of production, that is, 1.6%.

Figure 7A:
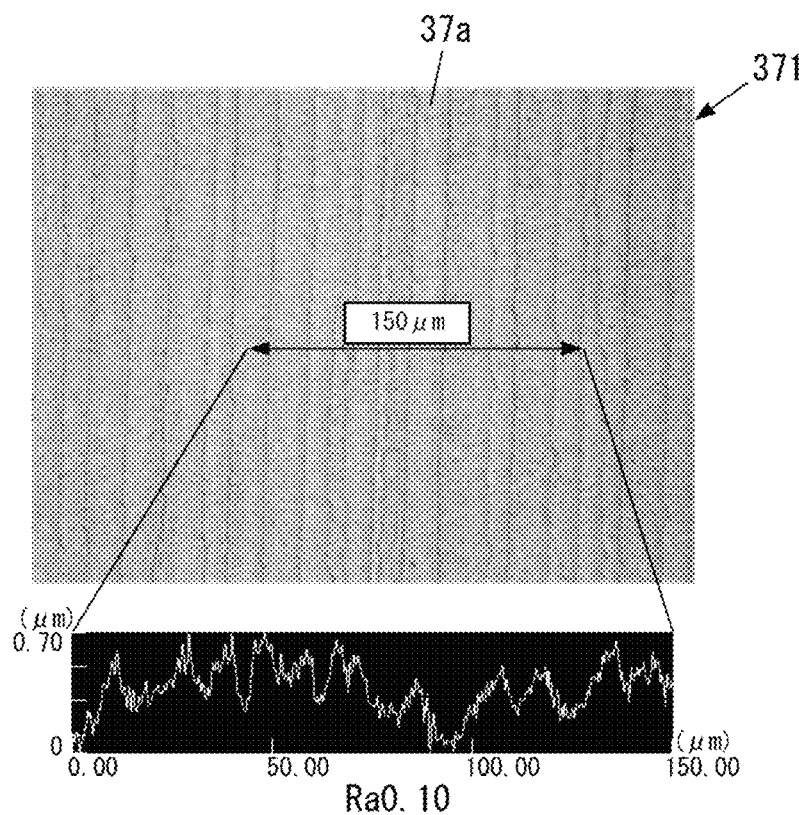
FIG. 7A is a drawing-substituting photograph showing a micrograph obtained by photographing the liquid contact surface at the bending portion from the front at the time of production of the rolling diaphragm of the first embodiment.
Figure 7B:
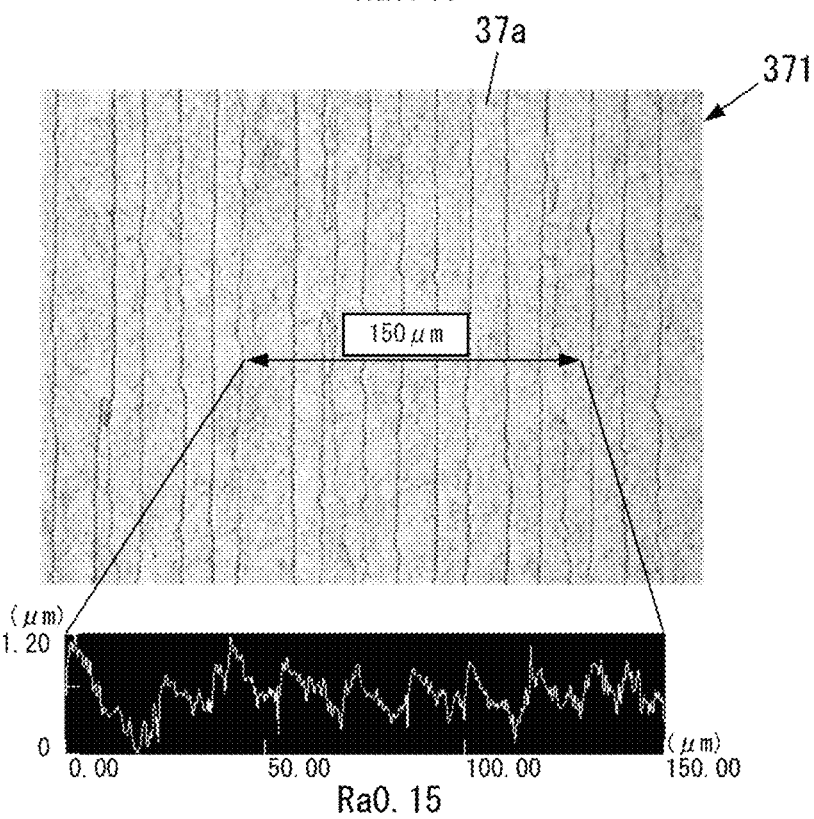
FIG. 7B is a drawing-substituting photograph showing a micrograph obtained by photographing the liquid contact surface at the bending portion from the front after the rolling diaphragm of the first embodiment was repeatedly bent.

FIG. 7A is a drawing-substituting photograph showing a micrograph obtained by photographing the liquid contact surface 37a at the bending portion 371 from the front at the time of production of the rolling diaphragm 5 of the present embodiment (before use) in the verification test. FIG. 7B is a drawing-substituting photograph showing a micrograph obtained by photographing the liquid contact surface 37a at the bending portion 371 from the front after the rolling diaphragm 5 of the present embodiment was repeatedly bent 5 million times in the verification test. At the lower side of each of FIG. 7A and FIG. 7B, an enlarged cross-sectional view taken for a predetermined length (about 150 µm) at an arbitrary location on the liquid contact surface 37a is also shown.

As shown in FIG. 7A and FIG. 7B, when the rolling diaphragm 5 of the present embodiment was repeatedly bent 5 million times from the time of production, it is found that, in the uneven shape of the liquid contact surface 37a at the bending portion 371, the number of projections did not decrease so much, and the top of each projection did not become deformed so much. It is found that the surface roughness of the liquid contact surface after the repeated bending of 5 million times was 0.15 µm as an arithmetic average roughness and did not change so much as compared to the surface roughness (0.10 µm as an arithmetic average roughness) at the time of production. Similar to the conventional rolling diaphragm, it is also found that the average of the total light reflectance in the wavelength range of 300 nm to 800 nm after the repeated bending of 5 million times was 2.2% and unchanged from the average of the total light reflectance in the wavelength range of 300 nm to 800 nm at the time of production, that is, 2.2%.

From the above verification results, it is found that, when the surface roughness of the liquid contact surface 37a at the bending portion 371 of the rolling diaphragm 5 is set to be less than 0.4 µm as an arithmetic average roughness and the total light reflectance of the liquid contact surface 37a at the bending portion 371 is set to be not less than 2.0%, the surface roughness can be inhibited from being increased. Accordingly, parts, of the liquid contact surface 37a at the bending portion 371, opposing each other can be inhibited from rubbing against each other as described above, and thus abrasion powder of the fluorine resin member forming the bending portion 371 can be effectively inhibited from being generated as particles from the liquid contact surface 37a.

Second Embodiment

Figure 8:
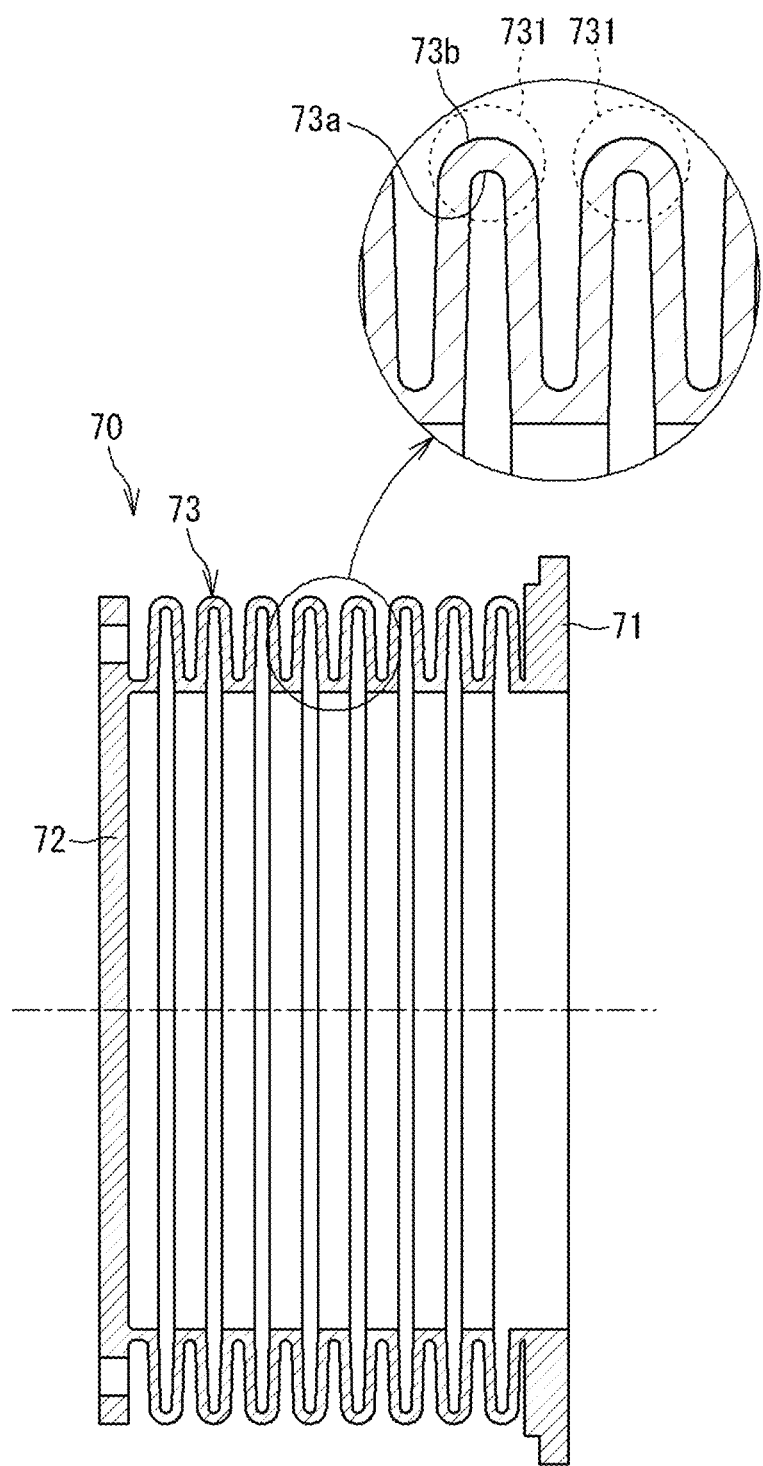
FIG. 8 is a cross-sectional view showing a most contracted state of a bellows composed of a resin member according to a second embodiment of the present invention.

FIG. 8 is a cross-sectional view showing a bellows composed of a resin member according to a second embodiment of the present invention. The bellows 70 of the second embodiment is a member that is used, for example, in a bellows pump (not shown) that supplies a liquid (transport fluid) such as a chemical solution in a certain amount, in a semiconductor production apparatus.

The bellows 70 is composed of a fluorine resin member of polytetrafluoroethylene (PTFE), a tetrafluoroethylene-perfluoro alkyl vinyl ether copolymer (PFA), or the like, and is formed in a cylindrical shape with a bottom portion. The bellows 70 has an annular fixed portion 71 that is disposed at one side in the axial direction and that is fixed to a pump case (not shown) side, a disc-shaped movable portion 72 that is disposed at the other side in the axial direction, and an accordion-shaped connection portion 73 that connects the fixed portion 71 to the movable portion 72. In the bellows 70, the fixed portion 71, which is disposed at the one side in the axial direction, may be formed as a movable portion, and the movable portion 72, which is disposed at the other side in the axial direction, may be formed as a fixed portion.

Figure 9:
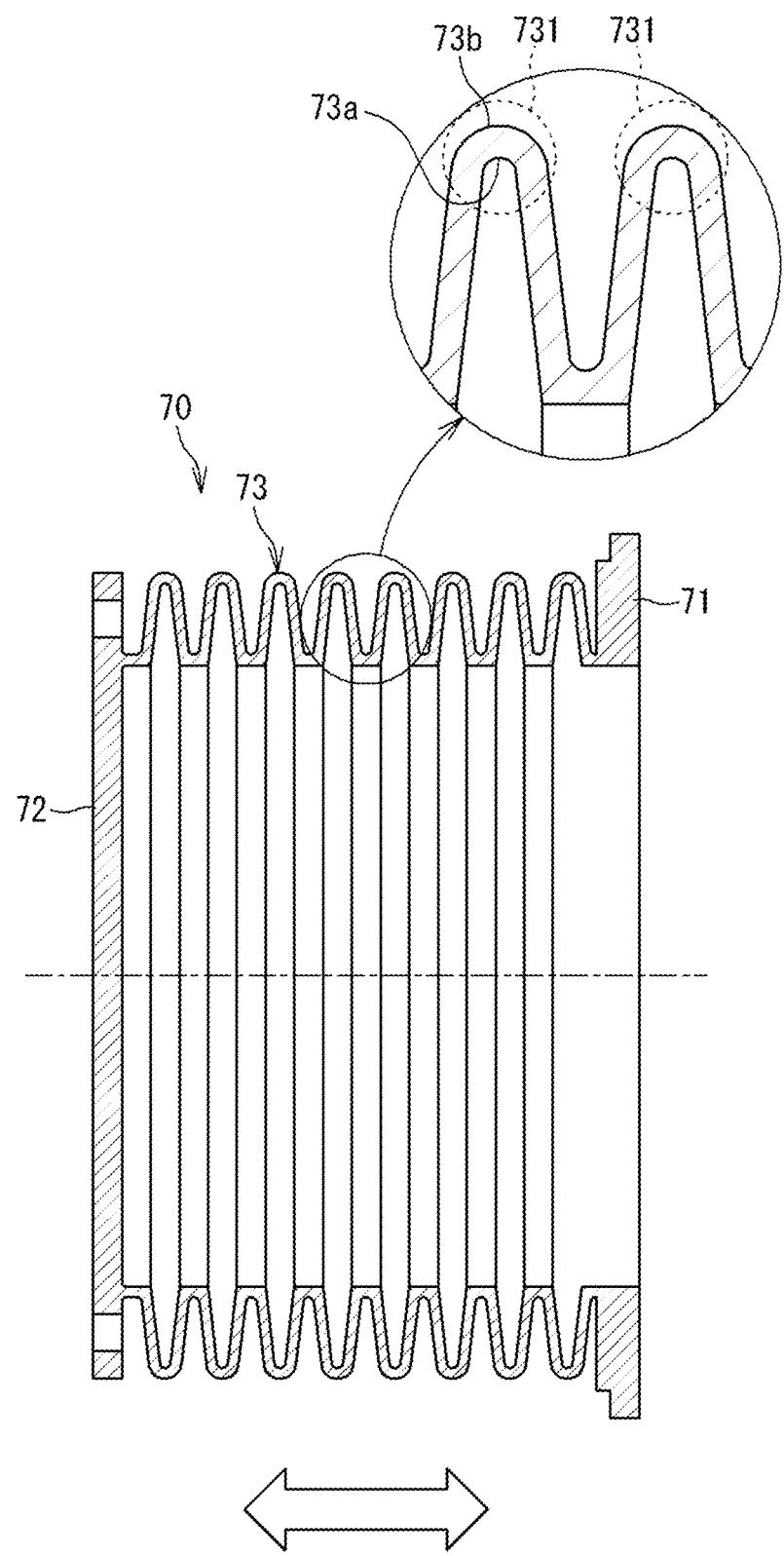
FIG. 9 is a cross-sectional view showing a most expanded state of the bellows of the second embodiment.

The connection portion 73 is formed to be thin (in a thin film shape) so as to have flexibility, and is configured to expand/contract in the axial direction between a most contracted state shown in FIG. 8 and a most expanded state shown in FIG. 9. Meanwhile, the fixed portion 71 and the movable portion 72 are each formed to be sufficiently thicker than the connection portion 73 so as to have rigidity.

The bellows 70 is configured to suck and discharge a liquid by the connection portion 73 making expansion/contraction motions in the axial direction relative to the fixed portion 71, which is fixed to the pump case side, to cause the movable portion 72 to move in a reciprocating manner in the axial direction.

Specifically, when the bellows 70 expands from the most contracted state (see FIG. 8) to the most expanded state (see FIG. 9), a liquid is sucked into the bellows 70 through a check valve (not shown) connected to an open end portion of the bellows 70. When the bellows 70 contracts from the most expanded state (see FIG. 9) to the most contracted state (see FIG. 8), the liquid within the bellows 70 is discharged through the check valve to the outside.

Therefore, the inner peripheral surface (one surface) of the connection portion 73 is formed as a liquid contact surface 73a with which the liquid sucked into the connection portion 73 is in contact. In addition, the outer peripheral surface (another surface) of the connection portion 73 is formed as a non-liquid contact surface 73b with which the liquid is not in contact.

In the configuration described above, by causing the bellows 70 to repeat expansion/contraction motions in order to drive the bellows pump, a liquid suction process and a liquid discharge process are alternately and repeatedly performed. Accordingly, although not shown, a liquid stored in a liquid tank can be supplied to a liquid supply portion in a constant amount by the bellows pump.

However, when the suction process and the discharge process are alternately and repeatedly performed, a bending motion from a state before bending shown in FIG. 9 to a state during bending in which a plurality of portions 731 that bend into a U cross-sectional shape (hereinafter, also referred to as bending portions 731) are formed as shown in FIG. 8 is repeatedly performed in the connection portion 73 of the bellows 70. Thus, on the liquid contact surface 73a at each bending portion 731, particles (fine dust) may be generated due to deterioration over time caused by the bending motion.

Figure 10:
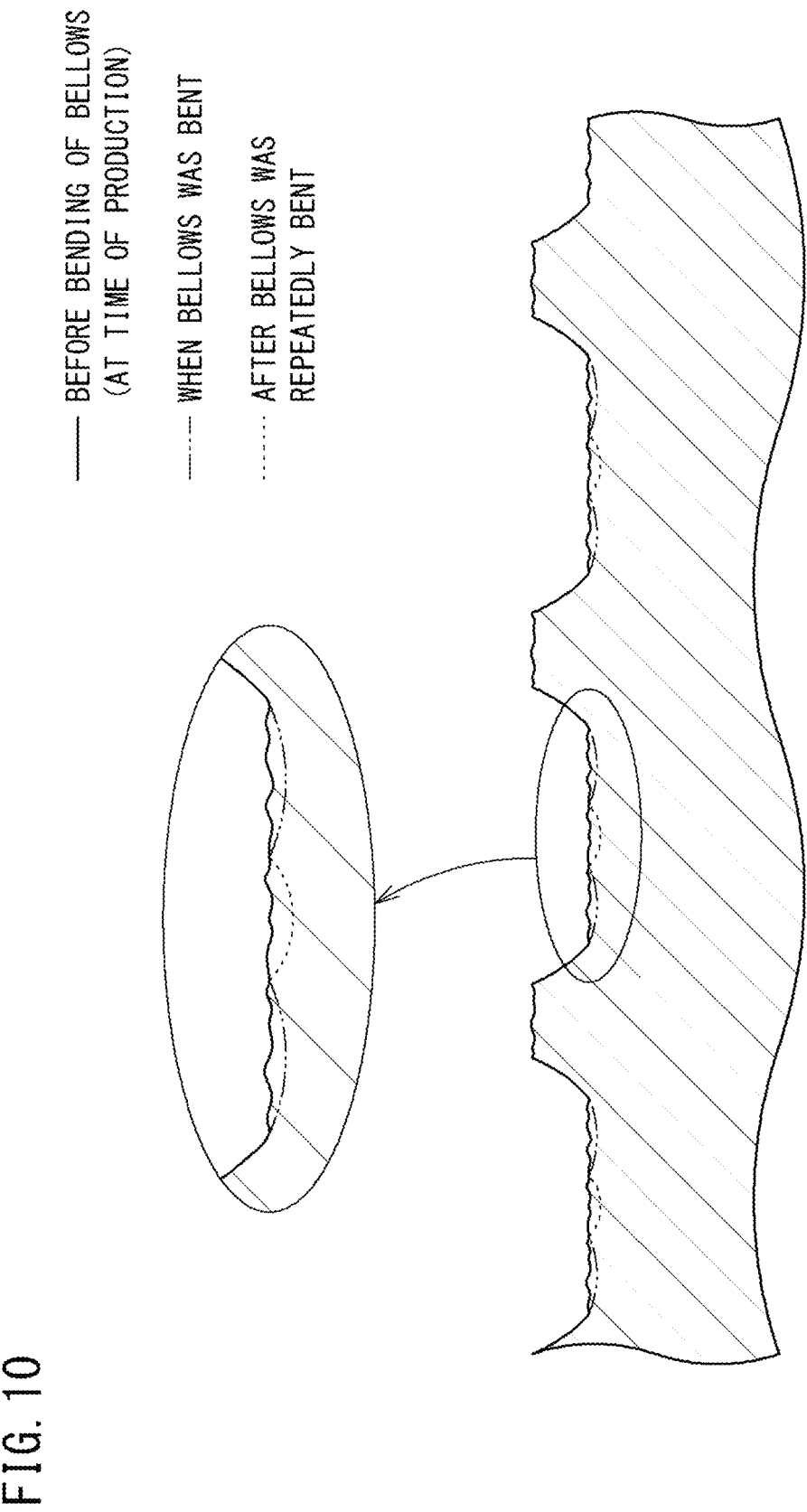
FIG. 10 is an enlarged cross-sectional view showing change in an uneven shape of a liquid contact surface at a bending portion of a conventional bellows.

Here, the mechanism of generation of particles at the bellows will be described. FIG. 10 is an enlarged cross-sectional view showing change in an uneven shape (surface roughness) of a liquid contact surface at a bending portion of a conventional bellows. As shown in FIG. 10, the uneven shape (cross-sectional shape) of the liquid contact surface at the bending portion of the conventional bellows is a shape in which recesses and projections are alternately continuous, and a rough flat surface having minute bumps and depressions is formed at each of the bottoms of the recesses and the ends of the projections.

In the conventional bellows, regarding the uneven shape of the liquid contact surface at the bending portion, a shape before bending (shape at the time of production) shown by a solid line in FIG. 10 and a shape during bending shown by alternate long and two short dashes lines in FIG. 10 are alternately repeated over a long period of time, whereby the recesses of the liquid contact surface at the bending portion become deformed (deteriorate over time) such that the depths thereof are larger as shown by broken lines in FIG. 10, resulting in an increase in the surface roughness of the liquid contact surface.

By repeating the above bending motion in a state where the surface roughness of the liquid contact surface at the bending portion is increased due to repetition of the bending motion as described above, deformation further proceeds such that the depths of the recesses of the liquid contact surface at the bending portion are gradually increased, so that cracking easily occurs at the bottoms of the recesses. Accordingly, fine resin powder of a fluorine resin member forming the bending portion is generated from locations where the cracking has occurred, and accumulates at the recesses, and the accumulating resin powder is washed away by a liquid that is a transport fluid. The washed-away resin powder becomes particles generated from the liquid contact surface at the bending portion.

Therefore, in the present invention, in order to inhibit generation of the particles, at the time of production of the bellows 70 (before use), the surface roughness of the liquid contact surface 73a at each bending portion 731 is set to be less than 0.40 μm as an arithmetic average roughness (Ra). In addition, in the present invention, in order to inhibit generation of the particles, at the time of production of the bellows 70 (before use), the total light reflectance of the liquid contact surface 37a at each bending portion 371 in the wavelength range of 300 nm to 800 nm is set to be not less than 2.0% and not greater than 3.0%.

In the present embodiment, the surface roughness of the liquid contact surface 73a at each bending portion 731 is set to 0.10 μm as an arithmetic average roughness, and the total light reflectance of the liquid contact surface 73a in the wavelength range of 300 nm to 800 nm is set to be not less than 2.0% and not greater than 3.0% (the average of the total light reflectance in the wavelength range of 300 nm to 800 nm is set to 2.0%).

The methods for measuring the arithmetic average roughness (Ra) and the total light reflectance are the same as those in the above embodiment.

Figure 11:
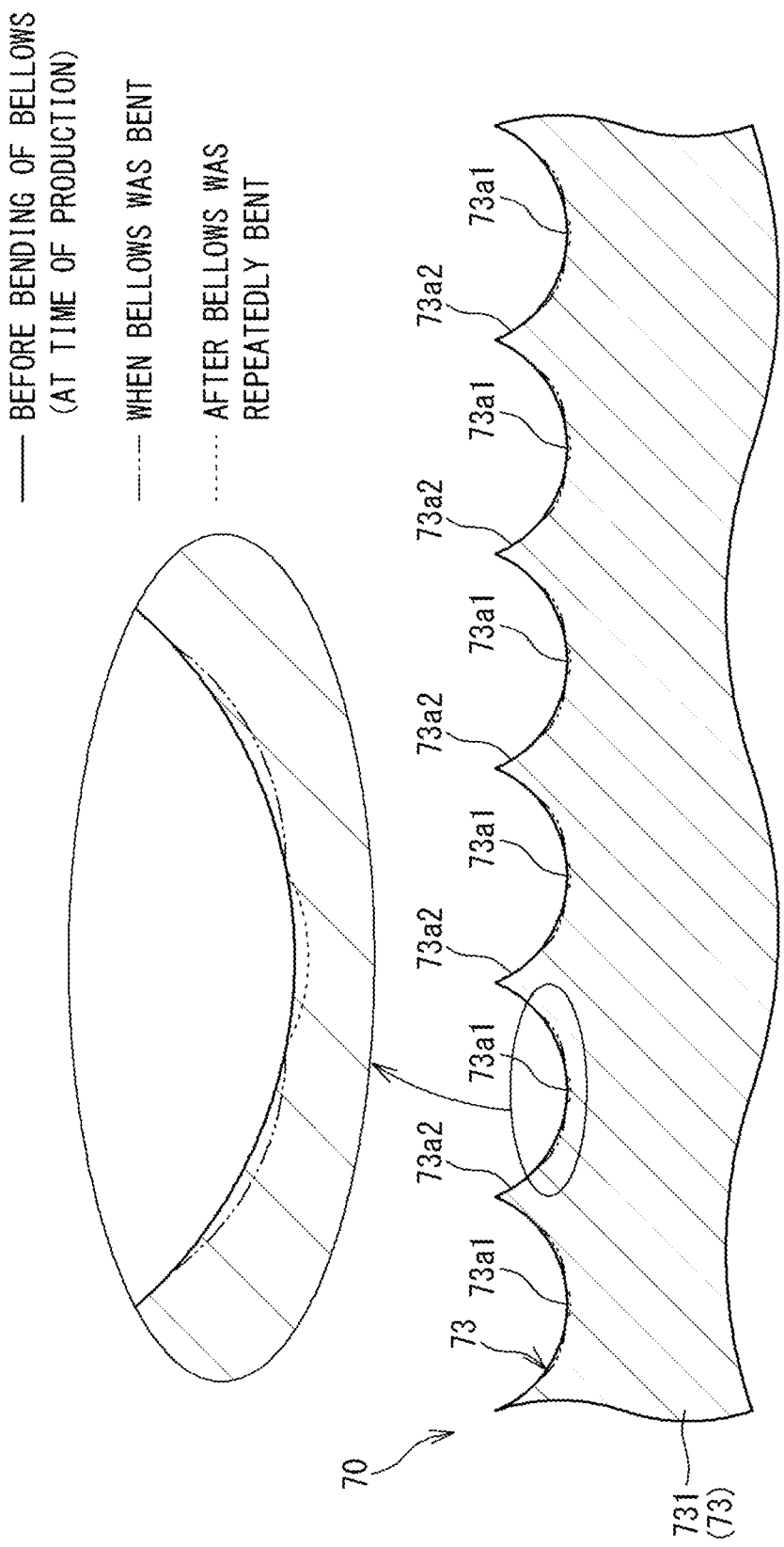
FIG. 11 is an enlarged cross-sectional view showing change in an uneven shape of a liquid contact surface at a bending portion of the bellows of the second embodiment.

FIG. 11 is an enlarged cross-sectional view showing change in uneven shape (surface roughness) of the liquid contact surface 73a at the bending portion 731 of the bellows 70 of the present embodiment. As shown in FIG. 11, the uneven shape (cross-sectional shape) of the liquid contact surface 73a at the bending portion 731 of the bellows 70 of the present embodiment is a shape in which recesses 73a1 and projections 73a2 are alternately continuous, the recesses 73a1 are formed by concave arc surfaces that are concave curved surfaces, and the ends of the projections 73a2 are formed as sharp ends (the angle at each end is less than 90°). Thus, unlike the conventional uneven shape (see FIG. 10), no flat surfaces are formed at the recesses 73a1 and the projections 73a2 of the present embodiment. The recesses 73a1 may be concave curved surfaces other than concave arc surfaces.

In the bellows 70 of the present embodiment as well, regarding the uneven shape of the liquid contact surface 73a at each bending portion 731, a shape before bending (shape at the time of production) shown by a solid line in FIG. 11 and a shape during bending shown by alternate long and two short dashes lines in FIG. 11 are alternately repeated over a long period of time, whereby the recesses of the liquid contact surface 73a at the bending portion 731 become deformed such that the depths thereof are larger as shown by broken lines in FIG. 11.

However, when the deformation of the recesses of the liquid contact surface 73a at the bending portion 731 shown by the broken lines in FIG. 11 is compared to the deformation of the recesses of the liquid contact surface at the conventional bending portion shown by the broken lines in FIG. 10, it is found that the amount of the deformation is small, so that an increase in the surface roughness due to repetition of the bending motion can be inhibited. Therefore, occurrence of cracking at the bottoms of the recesses in the bending portion 731 can be inhibited as described above, and thus resin powder of the fluorine resin member forming the bending portion 731 can be effectively inhibited from being generated as particles from the liquid contact surface 73a.

As described above, in the bellows 70 composed of the resin member of the second embodiment, since the surface roughness of the liquid contact surface 73a at each bending portion 731 is set to be less than 0.40 μm as an arithmetic average roughness, particles can be inhibited from being generated even when the bending portions 731 are repeatedly bent. As a result, occurrence of a production defect or the like due to application of particles transferred together with a liquid, to a wafer or the like, can be effectively inhibited.

Moreover, since the surface roughness of the liquid contact surface 73a at each bending portion 731 is set to 0.10 μm as an arithmetic average roughness, and the total light reflectance of the liquid contact surface 73a in the wavelength range of 300 nm to 800 nm is set to be not less than 2.0% and not greater than 3.0% (the average of the total light reflectance in the wavelength range of 300 nm to 800 nm is set to 2.0%), generation of particles due to repeated bending of each bending portion 731 can be further effectively inhibited.

Furthermore, when observed at a magnification of 1000 times, the cross-sectional shape of the liquid contact surface 73a at each bending portion 731 is a shape in which the recesses 73a1 and the projections 73a2 are alternately continuous, the recesses 73a1 are formed by concave arc surfaces, and the ends of the projections 73a2 are formed as sharp ends. Accordingly, no flat surfaces are formed at the bottoms of the recesses 73a1 and the ends of the projections 73a2 in the cross-sectional shape of the liquid contact surface 73a at each bending portion 731, and thus the number of the recesses 73a1 and the projections 73a2 is increased. As a result, the surface roughness of the liquid contact surface 73a at each bending portion 731 can be effectively decreased, and the total light reflectance of the liquid contact surface 73a at each bending portion 731 can be effectively increased. Thus, occurrence of particles due to repeated bending of each bending portion 731 can be further effectively inhibited.

Moreover, since the recesses 73a1 are formed by smooth concave arc surfaces, stress due to the repeated bending is less likely to be generated than in the conventional art. Accordingly, parts of the liquid contact surface 73a are less likely to rub against each other at the recesses 73a1, and thus occurrence of particles from the liquid contact surface 73a at the recesses 73a1 can be inhibited.

[Others]

The resin member of the present invention may be applied to other diaphragms such as an air-operated type valve diaphragm, other than the rolling diaphragm 5, and may be applied to other resin members that repeatedly bend when used and that have flexibility, other than the diaphragm and the bellows 70.

Although the diaphragm pump or the bellows pump used in the semiconductor production apparatus has been described as an example in each of the embodiments, application of the diaphragm pump or the bellows pump is not limited to application to the semiconductor production apparatus.

In each of the embodiments, when observed at a magnification of about 1000 times, the cross-sectional shape of the liquid contact surface at the bending portion 371 (731) is a shape in which the recesses 37a1 (73a1) and the projections 37a2 (73a2) are alternately continuous. However, the shape in which the recesses 37a1 (73a1) and the projections 37a2 (73a2) are alternately continuous may be observed at an arbitrary magnification as long as the surface roughness of the liquid contact surface is less than 0.40 μm as an arithmetic average roughness.

The embodiments disclosed herein are merely illustrative and not restrictive in all aspects. The scope of the present invention is defined by the scope of the claims rather than the meaning described above, and is intended to include meaning equivalent to the scope of the claims and all modifications within the scope.

REFERENCE SIGNS LIST 5 rolling diaphragm (resin member)
37a liquid contact surface
37a1 recess
37a2 projection
70 bellows (resin member)
73a liquid contact surface
73a1 recess
73a2 projection
371 bending portion (portion that bends)
731 bending portion (portion that bends)

The invention claimed is:

1. A resin member having one surface formed as a liquid contact surface, the resin member repeatedly bending when used, the resin member having flexibility, wherein
the resin member is a diaphragm for a pump, the diaphragm having:
a surface roughness of the liquid contact surface at a portion that bends is less than 0.40 μm as an arithmetic average roughness,
a total light reflectance of the liquid contact surface at the portion that bends is not less than 2.0%,
a cross-sectional shape of the liquid contact surface at the portion that bends is a shape in which recesses and projections are alternately continuous,
the recesses are formed by concave curved surfaces, wherein the recesses have no flat surface at a bottom of the concave curved surfaces, and
ends of the projections are formed as sharp ends, wherein the projections have no flat surfaces at an end of the sharp ends.

* * * * *